United States Patent
Chamberlain et al.

(10) Patent No.: US 9,201,926 B2
(45) Date of Patent: Dec. 1, 2015

(54) INTEGRATED TRAVEL SERVICES

(71) Applicant: GM Global Technology Operations LLC, Detroit, MI (US)

(72) Inventors: Spencer W. Chamberlain, Sterling Heights, MI (US); Wade W. Bryant, Gross Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 13/743,393

(22) Filed: Jan. 17, 2013

(65) Prior Publication Data

US 2013/0226905 A1 Aug. 29, 2013

Related U.S. Application Data

(60) Provisional application No. 61/602,869, filed on Feb. 24, 2012.

(51) Int. Cl.
*G06F 17/30* (2006.01)
*G06Q 10/04* (2012.01)
*G01C 21/36* (2006.01)
*G06Q 10/10* (2012.01)

(52) U.S. Cl.
CPC ...... *G06F 17/30477* (2013.01); *G01C 21/3641* (2013.01); *G06Q 10/047* (2013.01); *G06Q 10/109* (2013.01)

(58) Field of Classification Search
None
See application file for complete search history.

(56) References Cited

U.S. PATENT DOCUMENTS

| | | | | |
|---|---|---|---|---|
| 5,432,508 A * | 7/1995 | Jackson | | 340/932.2 |
| 7,486,201 B2 * | 2/2009 | Kelly et al. | | 340/905 |
| 7,893,847 B2 * | 2/2011 | Shanbhag et al. | | 340/932.2 |
| 8,612,137 B2 * | 12/2013 | Harris et al. | | 701/408 |
| 8,816,880 B1 * | 8/2014 | Foster | | 340/932.2 |
| 8,843,307 B1 * | 9/2014 | Kolodziej | | G01C 21/3685 340/932.2 |
| 2002/0161520 A1 * | 10/2002 | Dutta et al. | | G08G 1/14 701/469 |
| 2005/0240580 A1 * | 10/2005 | Zamir et al. | | 707/4 |
| 2006/0122770 A1 * | 6/2006 | Sasano | | 701/210 |
| 2007/0040701 A1 * | 2/2007 | Browne et al. | | 340/932.2 |
| 2008/0005695 A1 * | 1/2008 | Ozzie et al. | | 715/811 |
| 2009/0179776 A1 * | 7/2009 | Holden | | G08G 1/14 340/932.2 |
| 2010/0017118 A1 * | 1/2010 | Dougherty | | 701/209 |
| 2010/0198812 A1 * | 8/2010 | Athsani et al. | | 707/722 |
| 2012/0265434 A1 * | 10/2012 | Woodard et al. | | 701/423 |
| 2012/0269116 A1 * | 10/2012 | Xing et al. | | 370/328 |
| 2013/0151645 A1 * | 6/2013 | Siliski et al. | | 709/213 |
| 2013/0218449 A1 * | 8/2013 | Hymel et al. | | 701/408 |
| 2013/0262160 A1 * | 10/2013 | Miller et al. | | 705/5 |
| 2013/0268187 A1 * | 10/2013 | Scofield et al. | | 701/400 |

\* cited by examiner

*Primary Examiner* — Richard Bowen
(74) *Attorney, Agent, or Firm* — Cantor Colburn LLP

(57) ABSTRACT

Integrated travel services are provided via a computer processing device and logic executable by the computer processing device. The integrated travel services map activities to information databases, define conditions for generating alerts, and monitor user behaviors. Upon determining one of the user behaviors matches one of the activities, the integrated travel services access a corresponding database and, using the conditions in conjunction with data from the user behavior, search the corresponding database. The integrated travel services also generate an alert, in response to the search, upon determining that the search results indicate one of the conditions has been met.

17 Claims, 3 Drawing Sheets

300

| TIMESTAMP | | ORIG | DEST | ROUTE |
|---|---|---|---|---|
| 01/13/2012 | 08:29:13 | 48226 | 48746 | 1 |
| 01/13/2012 | 17:36:11 | 48746 | 48226 | 1 |
| 01/13/2012 | 19:32:01 | 48226 | 48226 | 9 |
| 01/16/2012 | 08:27:30 | 48226 | 48746 | 1 |
| 01/16/2012 | 17:32:30 | 48746 | 48226 | 1 |
| 01/17/2012 | 08:22:07 | 48226 | 48746 | 1 |
| 01/17/2012 | 17:14:14 | 48746 | 48226 | 1 |
| ... | | | | |
| 1/30/2012 | 06:05:50 | 48226 | 49022 | 2 |
| 1/30/2012 | 17:30:21 | 49022 | 48226 | 2 |
| ... | | | | |

TRAFFIC ACCIDENT ON INTERSTATE 94W (6:15AM). THE INTERSTATE IS SHUT DOWN FROM EXIT <X> TO EXIT <Y>. WOULD YOU LIKE TO CALCULATE A DIFFERENT ROUTE?

FIG. 4

INTEGRATED TRAVEL SERVICES

CROSS-REFERENCE TO RELATED APPLICATION

This patent application claims priority to U.S. patent application Ser. No. 61/602,869 filed Feb. 24, 2012 which is hereby incorporated herein by reference in its entirety.

FIELD OF THE INVENTION

The subject invention relates to communications and, more particularly, to integrated travel services.

BACKGROUND

With so many travelers on the road today, particularly in urban or congested areas, it can sometimes be problematic for individuals to realistically estimate travel times associated with trips. Many factors can adversely affect the amount of time it takes for an individual to get to his/her planned destination, such as weather, construction-related or accident-related detours, time of day (e.g., morning or evening commute times), lack of available parking, etc.

Many of today's automobiles come equipped with a number of value-added services and related devices. Onboard vehicle navigation, roadside service components, and cellular communications technology are just some of the items offered to consumers through their vehicles.

It is desirable to provide individuals with travel-related services that assist the individuals with their travel-based needs.

SUMMARY

In one embodiment of the invention, a system for providing integrated travel services is provided. The system includes a computer processing device and logic executable by the computer processing device. The logic is configured to implement a method. The method includes mapping activities to information databases, defining conditions for generating alerts, and monitoring user behaviors via the computer processing device. Upon determining one of the user behaviors matches one of the activities, the method includes accessing a corresponding database and, using the conditions in conjunction with data from the one of the user behaviors, searching the corresponding database, and generating an alert, responsive to the searching, upon determining that search results indicate one of the conditions has been met.

In another embodiment of the invention, a method for providing integrated travel services is provided. The method includes mapping, via a computer processing device, activities to information databases. The method also includes defining conditions for generating alerts and monitoring, via the computer processing device, user behaviors via the computer processing device. Upon determining one of the user behaviors matches one of the activities, the method includes accessing a corresponding database and, using the conditions in conjunction with data from the one of the user behaviors, searching the corresponding database. Upon determining one of the user behaviors matches one of the activities, the method further includes generating an alert, responsive to the searching, upon determining that search results indicate one of the conditions has been met.

In a further embodiment of the invention, a computer program product for providing integrated travel services is provided. The computer program product includes a storage medium having instructions embodied thereon, which when executed by a computer causes the computer to implement a method. The method includes mapping activities to information databases. The method also includes defining conditions for generating alerts and monitoring user behaviors via the computer. Upon determining one of the user behaviors matches one of the activities, the method includes accessing a corresponding database and, using the conditions in conjunction with data from the one of the user behaviors, searching the corresponding database. Upon determining one of the user behaviors matches one of the activities, the method further includes generating an alert, responsive to the searching, upon determining that search results indicate one of the conditions has been met.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a log generated by the integrated travel services that includes sample data in an exemplary embodiment; and FIG. 4 is a user interface screen generated by the integrated travel services in an exemplary embodiment.

DESCRIPTION OF THE EMBODIMENTS

Figure 1:
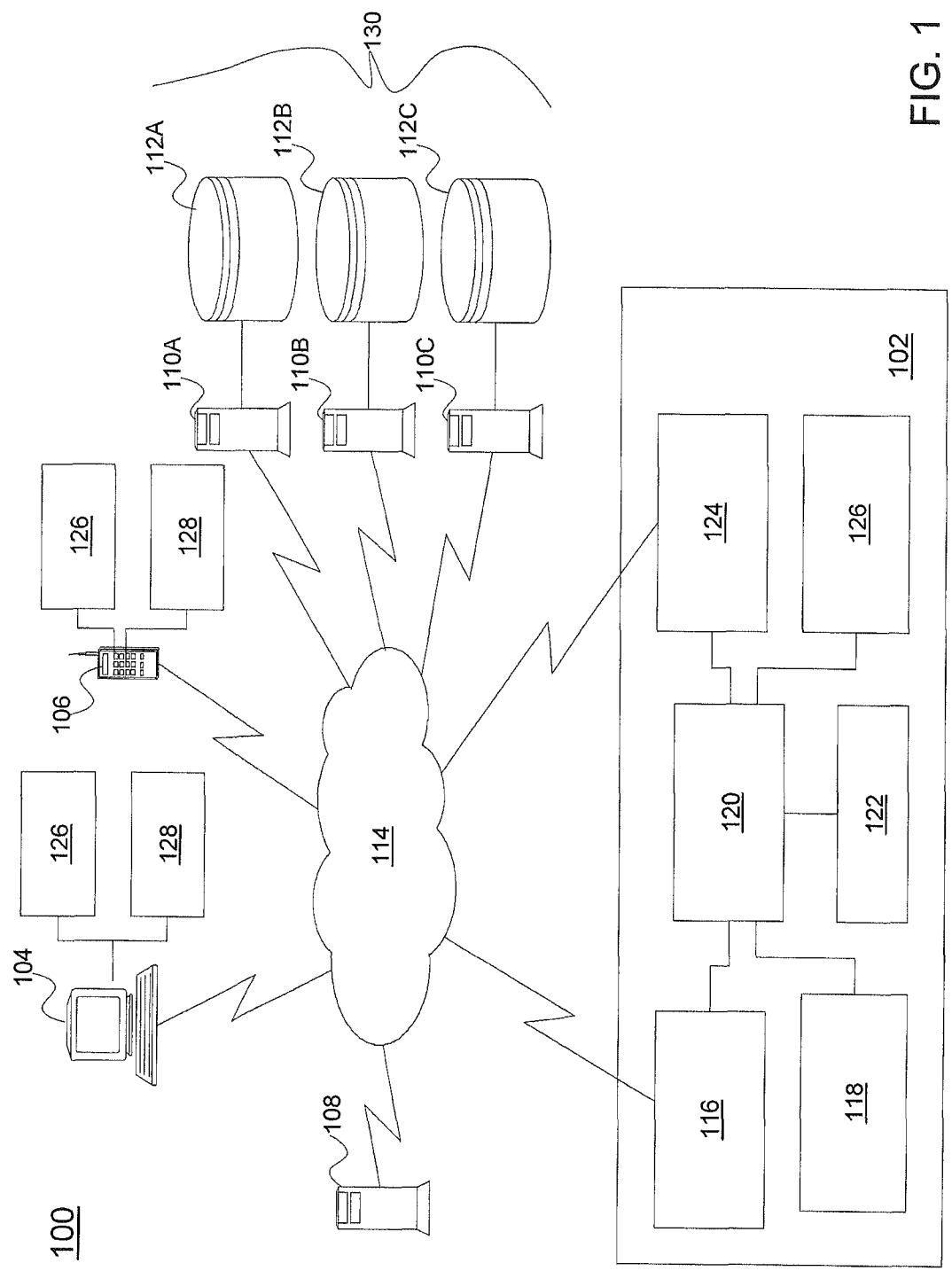
FIG. 1 is a diagram of a system upon which integrated travel services may be implemented in an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, integrated travel services are provided. The integrated travel services optimize travel-related activities by electronically coordinating an individual with a mass network of services including travel, delivery, personal safety services, and other services that allow the individual, as well as goods, to move efficiently to any location, and particularly, in urban areas. The integrated travel services provides an interface that is accessible anywhere through mobile and stationary electronic devices to help travelers and goods to move efficiently by coordinating with and connecting to private, public, government, and commercial transportation vehicle systems and services. The integrated travel services intelligently 'learn' and utilize past activities of individuals to estimate current and future activities. These and other features of the integrated travel services will now be described.

Turning now to FIG. 1, a system 100 upon which integrated travel services may be implemented will now be described in accordance with an embodiment. The system 100 of FIG. 1 illustrates a portion of a vehicle 102, user systems 104 and 106, telematics server 108, and information sources 130 communicatively coupled to networks 114. The vehicle 102 may be any type of automobile equipped with communications components, as described herein.

The user system 104 may be a general-purpose or desktop computer, or may be portable computer device, such as a laptop. The user system 106 may be a cellular telephone, smart phone, personal digital assistant, or similar device. The user systems 104 and 106 execute applications, such as a personal or business calendar application 128, as well as logic 126 for implementing the exemplary integrated travel services described herein. The user systems 104 and 106 may be operated by end users of the integrated travel services.

In an embodiment, the telematics server 108 may be implemented by a high-speed computer processing device, such as a mainframe computer or a network of computers including cloud computing resources, or similar type of device capable of handling the volume of activities conducted on behalf of its customers. The telematics server 108 provides roadside assistance, emergency and related services to its customers over one or more of the networks 114. For example, the telematics server 108 may be implemented by OnStar®, which is a subsidiary of General Motors that provides subscription-based communications, in-vehicle security, hands free calling, turn-by-turn navigation, and remote diagnostics systems throughout the United States, Canada, and China.

The information sources 130 include servers 110A-110C, and each of the servers 110A-110C is communicatively coupled to a storage device, shown in FIG. 1 as respective storage devices 112A-112C. Each of the servers 110A-110C may be implemented by a high-speed computer processing device, such as a mainframe computer, or similar type of device. The servers 110A-110C are configured to perform searches of information stored in respective storage devices 112A-112C and to provide search results from the searches to requesting entities, such as the vehicle 102, user systems 104 and 106, and telematics server 108, via one or more of the networks 114.

In an embodiment, the servers 110A-110C represent third-party entities which manage information stored in their corresponding storage devices 112A-112C, and which information is used by the logic 126 to assist end users of the vehicle 102 and user systems 104 and 106 in planning and implementing travel-related activities. For example, storage device 112A may store traffic information for a geographic region that is continuously updated over time. Storage device 112B may store weather reports and data for a geographic region that is also updated over time. Storage device 112C may store parking information for a geographic region or defined providers which is updated over time to provide up-to-date parking availability. While only three servers 110A-110C and corresponding storage devices 112A-112C are shown and described, it will be understood that any number of information sources 130 may be incorporated and accessed by the integrated travel services to provide traffic, weather, parking, and any other useful information to end users. The servers 110A-110C are provided for illustrative purposes only and are not to be construed as limiting in scope.

The vehicle 102 includes a controller 120 communicatively coupled to a navigation system 116, input/output (I/O) components 118, a storage device 122, and a telematics system 124 over a communication bus or wireless vehicle local area network (VLAN). The controller 120 may be implemented using a combination of hardware and software, e.g., the controller may include a computer processor that is configured to implement logic 126 for providing the integrated travel services.

The vehicle 102 uses signals received from satellites (e.g., within the networks 114) via a global positioning system (GPS) antenna (e.g., part of the navigation system 116) disposed on the vehicle 102. The location information may be received in the form of latitude and longitude coordinates and is used by the navigation system 116 to process the vehicle's location. Additionally, or alternatively, the location information may be tracked via a cellular network (e.g., one of the networks 114) and a cellular antenna on the user system 106 when it is with, or internal to, the vehicle 102. The navigation system 116 identifies a vehicle location and maps routes to user-specified destinations. In another embodiment, the telematics device 124 may include components that provide vehicle information to the telematics server 108, and the telematics server 108 provides information about and access to emergency and related services to the vehicle 102.

The I/O components 118 may include input buttons, a touch screen, a display screen, audio input and/or output elements, such as voice recognition components and audio speakers. These I/O components 118 may be elements that are part of a vehicle console or infotainment system.

The storage device 122 may be implemented using hardware components that are configured to store data. The storage device 122 is communicatively coupled to the controller 120 such that the controller 120 is capable of storing data and retrieving the stored data from the storage device 122.

In an embodiment, the controller 120 executes the logic 126 to provide alerts and perform associated tasks. The alerts and other information may be presented to a user within the vehicle 102, e.g., via the I/O components (such as a display device).

In an embodiment, the networks 114 may include any types of networks, such as Internet, cellular networks, satellite networks, terrestrial networks, etc.

Figure 2:
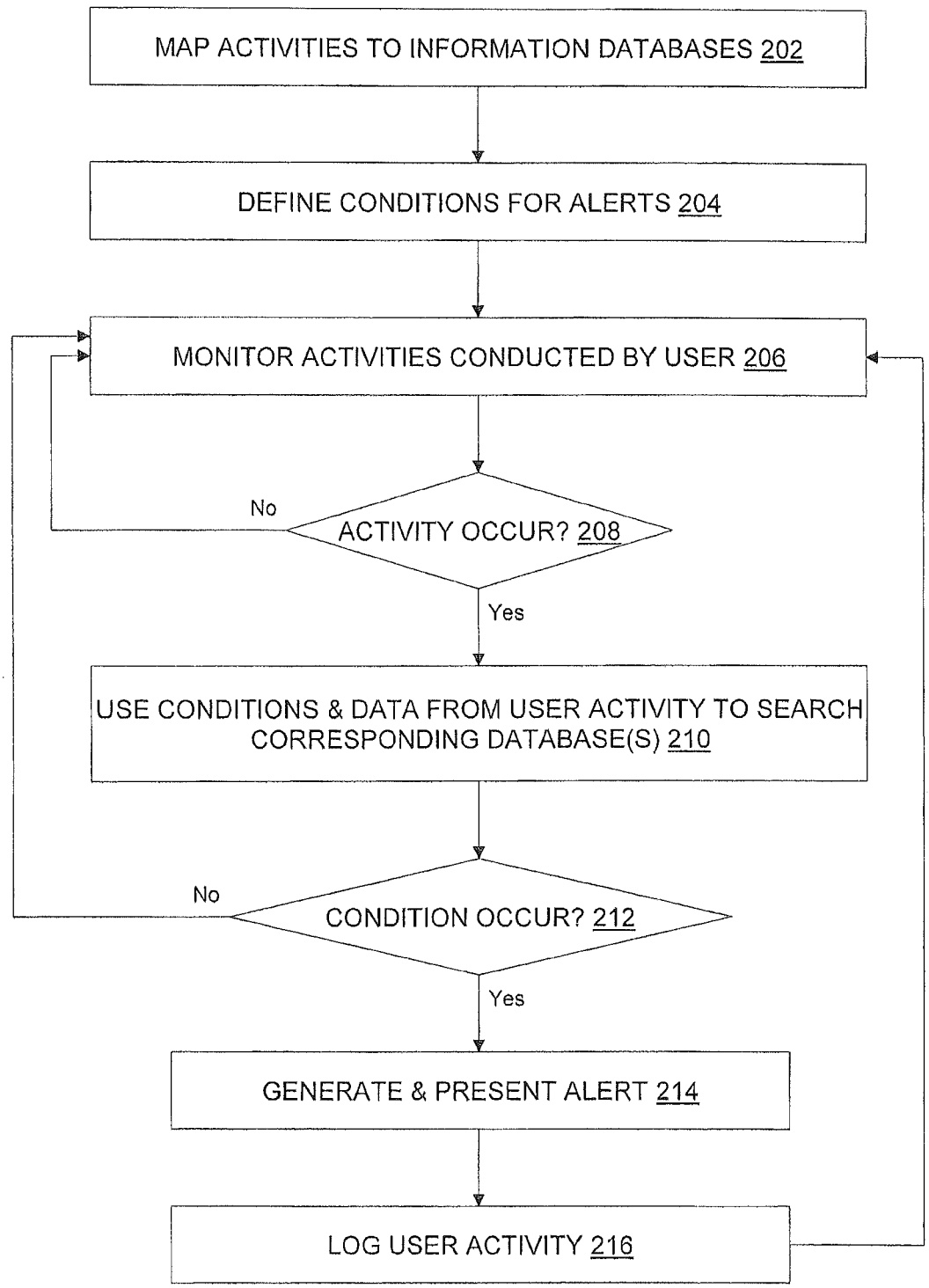
FIG. 2 is a flow diagram of a process for implementing integrated travel services in an exemplary embodiment.

Turning now to FIG. 2, a process 200 for implementing the integrated travel services will now be described in an embodiment.

At step 202, activities are mapped to information sources 130 using the logic 126. The activities specify any type of action, such as scheduling a trip using a calendar application 128 or activating the navigation system 116 of the vehicle 102 and entering in a destination or selecting a route to the destination. The mapping may be implemented using database tables and an index to the tables that lists the activities.

At step 204, conditions for generating alerts and performing other actions are defined via the logic 126. For example, one condition may be defined as "if a traffic incident is identified for a route, prompt user to select alternate route." Another condition may be defined as "if parking spaces fall below a defined threshold for parking garage/entity 'x,' search database of parking availability for parking garage 'y,' where parking garage 'x' is determined (in any suitable manner including by direct user input or learned from past user activities) to be the preferred garage for a particular destination.

At step 206, the logic 126 monitors user behaviors and activities. The logic 126 may monitor the user activity using various techniques. For example, the logic 126 may access the user's calendar application 128 and determine whether a trip has been scheduled and is imminent. The logic 126 may monitor the user's navigation system 116 selections to determine a destination, and may also employ GPS or cellular technology to ascertain the user's route.

At step 208, the logic 126 determines whether the user has performed one of the activities specified in step 202. If not, the process returns to step 206 and the logic 126 continues to monitor user activities.

If, however, one of the activities has been implemented by the user, the logic 126 accesses one or more corresponding information sources 130 (based on the mapping) and uses data from the activity, as well as the defined conditions to search the information sources 130 at step 210. For example, if the information source searched is a traffic database, the logic 126 enters data from the activity, such as routing information (street data, highway data, etc.) along with the current and estimated travel times to determine whether a condition has been met. At step 212, using the search results, the logic 126 determines if one of the conditions has been met. If not, the process returns to step 206 in which the logic 126 continues to monitor user activities.

If, however, one of the conditions has been met, the logic 126 generates an alert and presents the alert to the user at step 214. The alert may be generated as an audio message or a text message. A sample text-based alert 400 is shown in FIG. 4. For example, if the alert is a traffic alert, the logic 126 may present a message, such as:

"Traffic accident on interstate 94W (6:15AM). The interstate is shut down from exit <x> to exit <y>. Would you like to calculate a different route?"

At step 216, the logic 126 records the user activity in a log, which may be stored in the storage device 122. A sample log 300 is shown in FIG. 3. As shown in FIG. 3, the log files store the time and date of the activity (column 302), the origination location (column 304), the destination location (306) and a code that specifies the route taken (column 308). The origination and destination locations may be logged by using any identifying indicia. As shown in FIG. 3, the identifying indicia are the zip codes of the locations. The logic 126 may be configured to analyze the log files to identify patterns in the data, such as average time that the user begins a trip (origination), the average time the user arrives at the destination (destination), the typical route followed to and from the destination, etc. By identifying patterns of user behavior, the logic 126 can intelligently identify user preferences with regard to various activities, and automatically generate alerts when conditions are detected, or may perform other automated functions, such as searching a preferred parking garage database or automatically searching a second garage database when a preferred garage database indicates limited availability.

Technical effects include optimizing travel-related activities by electronically coordinating an individual with a mass network of services including travel, delivery, personal safety services, and other services that allow the individual, as well as goods, to move efficiently to any location, and particularly, in urban areas. The integrated travel services provides an interface that is accessible anywhere through mobile and stationary electronic devices to help travelers and goods to move efficiently by coordinating with and connecting to private, public, governmental, and commercial transportation vehicle systems and services. The integrated travel services intelligently 'learn' and utilize past activities of individuals to estimate current and future activities.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the application.

What is claimed is:

1. A system for providing integrated travel services, comprising:
   a computer processing device; and
   logic executable by the computer processing device, the logic configured to implement a method, the method comprising:
   mapping activities to information databases, each of the information databases operated by a third-party entity and storing data associated with a geographic region that corresponds to a location of the activities;
   defining conditions for generating alerts, the conditions including direct user input conditions and conditions learned from past user activities, the conditions further including parking conditions and at least one of weather conditions, and traffic conditions;
   monitoring user behaviors via the computer processing device;
   determining patterns of the user behaviors to intelligently identify user preferences associated with the conditions; and
   upon determining that the user preferences based on the patterns of the user behaviors matches one of the activities:
   accessing a corresponding one of the information databases and, using the conditions in conjunction with data from the user preferences based on the patterns of the user behaviors, searching the corresponding one of the information databases; and
   generating an alert, responsive to the searching, upon determining that search results indicate one of the conditions has been met, wherein the parking conditions include a number of parking spaces at a defined parking location associated with the patterns of user behavior being below a threshold value defined by the user.

2. The system of claim 1, wherein the activities include electronic calendar-based actions.

3. The system of claim 1, wherein the activities include route information associated with a vehicle navigation system.

4. The system of claim 1, wherein the conditions include traffic conditions.

5. The system of claim 1, wherein the conditions include weather conditions.

6. The system of claim 1, wherein the alert is an audio message.

7. The system of claim 1, wherein the alert is a text message.

8. A method for providing integrated travel services, comprising:

mapping, via a computer processing device, activities to information databases, each of the information databases operated by a third-party entity and storing data associated with a geographic region that corresponds to a location of the activities;

defining conditions for generating alerts, the conditions including direct user input conditions and conditions learned from past user activities, the conditions further including parking conditions and at least one of weather conditions, and traffic conditions;

monitoring, via the computer processing device, user behaviors via the computer processing device;

determining patterns of the user behaviors to intelligently identify user preferences associated with the conditions; and upon determining that the user preferences based on the patterns of the user behaviors matches one of the activities:

accessing a corresponding one of the information databases and, using the conditions in conjunction with data from the user preferences based on the patterns of the user behaviors, searching the corresponding one of the information databases;

determining whether a number of parking spaces at a defined parking location associated with the patterns of user behavior being below a threshold value defined by the user; and generating an alert, responsive to the searching, upon determining that search results indicate one of the conditions has been met.

9. The method of claim 8, wherein the activities include electronic calendar-based actions.

10. The method of claim 8, wherein the activities include route information associated with a vehicle navigation system.

11. The method of claim 8, wherein the conditions include traffic conditions.

12. The method of claim 8, wherein the conditions include weather conditions.

13. The method of claim 8, wherein the alert is an audio message.

14. The method of claim 8, wherein the alert is a text message.

15. A computer program product for providing integrated travel services, the computer program product comprising a storage medium having instructions embodied thereon, which when executed by a computer causes the computer to implement a method, the method comprising:

mapping activities to information databases, each of the information databases operated by a third-party entity and storing data associated with a geographic region that corresponds to a location of the activities;

defining conditions for generating alerts, the conditions including direct user input conditions and conditions learned from past user activities, the conditions further including parking conditions and at least one of weather conditions, and traffic conditions;

monitoring user behaviors via the computer processing device;

determining patterns of the user behaviors to intelligently identify user preferences associated with the conditions; and upon determining that the user preferences based on the patterns of the user behaviors matches one of the activities:

accessing a corresponding one of the information databases and, using the conditions in conjunction with data from the user preferences based on the patterns of the user behaviors, searching the corresponding one of the information databases;

determining whether a number of parking spaces at a defined parking location associated with the patterns of user behavior being below a threshold value defined by the user; and generating an alert, responsive to the searching, upon determining that search results indicate one of the conditions has been met.

16. The method of claim 15, wherein the activities include electronic calendar-based actions.

17. The method of claim 15 wherein the activities include route information associated with a vehicle navigation system.

* * * * *